(12) United States Patent
Piekarski

(10) Patent No.: US 9,021,125 B2
(45) Date of Patent: Apr. 28, 2015

(54) CONTROL PATH I/O VIRTUALISATION

(75) Inventor: Marek Piekarski, Macclesfield (GB)

(73) Assignee: Micron Technology, Inc., Boise, ID (US)

( * ) Notice: Subject to any disclaimer, the term of this patent is extended or adjusted under 35 U.S.C. 154(b) by 379 days.

(21) Appl. No.: 12/315,723

(22) Filed: Dec. 5, 2008

(65) Prior Publication Data
US 2009/0150563 A1      Jun. 11, 2009

Related U.S. Application Data

(60) Provisional application No. 61/012,257, filed on Dec. 7, 2007.

(30) Foreign Application Priority Data

Dec. 7, 2007    (GB) .................................. 0723939.5

(51) Int. Cl.
G06F 15/173     (2006.01)
G06F 7/00       (2006.01)
H04L 12/931     (2013.01)
H04L 12/935     (2013.01)

(52) U.S. Cl.
CPC ............... *H04L 49/35* (2013.01); *H04L 49/30* (2013.01); *H04L 49/3009* (2013.01); *H04L 49/45* (2013.01); *H04L 49/70* (2013.01)

(58) Field of Classification Search
USPC ........................................................ 709/238
See application file for complete search history.

(56) References Cited

U.S. PATENT DOCUMENTS 5,386,524 A * 1/1995 Lary et al. ...................... 711/206
6,463,265 B1 * 10/2002 Cohen et al. ................ 455/186.1
6,484,209 B1 * 11/2002 Momirov ....................... 709/238

(Continued)

FOREIGN PATENT DOCUMENTS

JP         2003044421 A      2/2003

OTHER PUBLICATIONS

Search Report dated Mar. 17, 2008 for corresponding Great Britain Application No. 0723939.5, 1 pg.
Suzuki et al., "ExpressEther—Ethernet-Based Virtualization Technology for Reconfigurable—Hardware Platform," Proceedings of the 14th IEEE Symposium on High-Performance Interconnects, Aug. 23-25, 2006, 7 pgs.

(Continued)

*Primary Examiner* — Brian P Whipple
*Assistant Examiner* — James Edwards
(74) *Attorney, Agent, or Firm* — Shumaker & Sieffert, P.A.

(57) ABSTRACT

There is disclosed a data switch in combination with a proxy controller, the data switch being configured for routing data traffic and control traffic between at least one input/output (I/O) device and at least one server including a memory having an address space including set of data buffers and a list of command/status descriptors. The data switch is configured to:

i) distinguish between different types of traffic by examining packet headers;
ii) route data traffic directly between the at least one I/O device and the at least one server; and
iii) route control traffic by way of the proxy controller.

In this way, I/O devices can be virtualized, since only the control traffic (which generally comprises less than 10% of the bandwidth) needs be processed by the proxy controller.

20 Claims, 2 Drawing Sheets

(56) References Cited

U.S. PATENT DOCUMENTS

| | | |
|---|---|---|
| 6,883,083 B1 | 4/2005 | Kemkar |
| 7,778,158 B2 * | 8/2010 | Vogel et al. .................. 370/217 |
| 2003/0105830 A1 * | 6/2003 | Pham et al. .................. 709/216 |
| 2003/0110157 A1 * | 6/2003 | Maki et al. ...................... 707/1 |
| 2004/0028043 A1 * | 2/2004 | Maveli et al. ................ 370/392 |
| 2004/0057380 A1 * | 3/2004 | Biran et al. .................. 370/235 |
| 2004/0139237 A1 | 7/2004 | Rangan et al. |
| 2006/0112251 A1 * | 5/2006 | Karr et al. .................... 711/170 |
| 2006/0193327 A1 | 8/2006 | Arndt et al. |
| 2006/0235973 A1 * | 10/2006 | McBride et al. .............. 709/226 |
| 2006/0242330 A1 * | 10/2006 | Torudbakken et al. ........... 710/5 |
| 2013/0117621 A1 * | 5/2013 | Saraiya et al. ................ 714/748 |

OTHER PUBLICATIONS

Office Action for Japanese Patent Application 2010-536539, dated Jun. 25, 2013 (3 pages).

Examination Report and English Translation for Japanese Patent Application 2010-536539, dated Jan. 8, 2013 (10 pages).

Japanese Office Action from Japanese Patent Application No. 2010-536,539 mailed Jun. 25, 2013, 4 pp.

* cited by examiner

CONTROL PATH I/O VIRTUALISATION

This application claims the benefit of U.S. Provisional Application No. 61/012,257, filed Dec. 7, 2007, and U.K. Patent Application No. GB 0723939.5, filed Dec. 7, 2007, the contents of each of which are hereby incorporated by reference in their entirety.

TECHNICAL FIELD

Embodiments of the present invention relate to virtualisation of I/O (input/output) devices, for example Ethernet controllers, Fibre Channel controllers and the like.

BACKGROUND

In computer network implementations, I/O resources such as Ethernet and storage controllers have traditionally been incorporated into servers, with each server having its own set of I/O resources. However, since high-performance I/O resources can often be more expensive than the servers themselves, it is advantageous for a number of servers to share one or more I/O resources that are external to the servers. Moreover, such configurations can be more robust, since the relevant I/O resources can still be used if one or more of the servers malfunctions.

I/O virtualisation is a methodology which transforms accesses between standard I/O devices and standard servers such that the I/O devices can be shared across multiple servers in a way which hides the sharing from both the servers and the I/O devices.

I/O virtualisation has a number of benefits. While each virtual system requires its own dedicated I/O resources, in many physical configurations the number of I/O devices available on a client or servers may be insufficient or not of the correct type to provide each application with the required I/O connectivity and bandwidth.

Moreover, the use of a centrally managed I/O resource improves the scalability of I/O while simplifying the management of the networks and systems. Both blade and rack-mount servers can access the resources they need, when they need them. Furthermore, because I/O can be managed from a centralised switch, administrators can allocate resources more easily and efficiently.

The centralised approach to I/O virtualisation also offers network administrators a new opportunity to maximise network I/O load balancing and bandwidth management. If a server needs additional bandwidth, for example, network managers can allocate more I/O capacity. In addition, if a server has more I/O resources than necessary, they can be reallocated to other more needy servers.

I/O virtualisation promises to pay dividends in higher system reliability. By eliminating excessive redundancy in peripherals and ports across the network infrastructure and reducing the number of components in the network, failure rates will be minimised.

Because network administrators can better match I/O resources to performance needs and thereby use fewer cards, cables and ports, I/O virtualisation also promises to dramatically reduce system costs.

Typical I/O device virtualisation solutions today are as follows:
1. Virtual devices emulation in server virtualisation software such as VMware, Xen and Microsoft Virtual Server. This allows multiple Virtual Machines on a single physical server to share a single physical I/O device. There is no capability to share I/O resources across multiple physical servers.
2. High level I/O virtualisation combined with I/O network such as Ethernet or Infiniband. This enables multiple servers to share access to an abstracted I/O service delivered by a specialised I/O gateway appliance.
3. Low level PCI-based I/O virtualisation as defined by the PCI-SIG IOV standards. This defines an extension to the ubiquitous PCI protocols to allow commodity I/O devices to be shared by multiple servers.
4. Low level PCI-based I/O virtualisation of legacy I/O devices by addition of an in-band virtualisation device which adds PCI IOV-like features to existing devices. This is exemplified by the NextIO non-commercial technology demonstrator seen in 2005.

High level solutions (1 and 2 above) provide some of the management benefits of I/O virtualisation, but at great cost and frequently with severe performance penalties. This is due to the fact that the I/O traffic has to undergo several layers of translation/encapsulation and that the hardware I/O devices are emulated in software. For low performance I/O this can be an acceptable solution, but in high I/O performance systems these solution become impractical.

The PCI-SIG IOV solution (3 above) resolves these cost/performance issues by enabling the native I/O interface to become a true multi-host network and by modifying the I/O devices to allow them to support multiple servers. There is no emulation and no translation of protocols. A practical problem exists, however, in that the existing PCI infrastructure is not fully forward compatible. Various new I/O and switch devices must be designed, implemented and brought to market specifically to solve this problem, and given the complex interdependencies, it is not clear how the technology can be introduced.

NextIO produced a PCI IOV demonstrator in 2005 (4 above) which used existing I/O devices by implementing an IOV switch (much as per the PCI-SIG standard) and by adding to each device an in-band virtualisation front end device. This was not however a commercially viable solution since the front end device was very expensive compared to the commodity I/O devices.

Accordingly, it would be desirable to add virtualisation to existing I/O devices, for example (but not exclusively) PCI I/O devices, and yet avoid the problems outlined above in relation to the existing solutions.

BRIEF SUMMARY OF THE DISCLOSURE

In the following description, reference shall be made to PCI (Peripheral Component Interconnect standard, including PCI Express) implementations of the present invention, but it will be understood that other embodiments may find application in different environments.

According to a first aspect of the present invention, there is provided a data switch in combination with a proxy controller, the data switch being configured for routing data traffic and control traffic between at least one input/output (I/O) device and at least one server including a memory having a set of data buffers and a list of command/status descriptors, wherein the data switch is configured to:
 i) distinguish between different types of traffic by examining packet headers;
 ii) route data traffic directly between the at least one I/O device and the at least one server; and
 iii) route control traffic by way of the proxy controller.

According to a second aspect of the present invention, there is provided a method of routing data traffic and control traffic between at least one input/output (I/O) device and at least one server by way of a data switch in combination with a proxy controller, wherein the server includes a memory having a set of data buffers and a list of command/status descriptors, and wherein the data switch:

i) distinguishes between different types of traffic by examining packet headers;

ii) routes data traffic directly between the at least one I/O device and the at least one server; and iii) routes control traffic by way of the proxy controller.

The proxy controller reads the descriptors and is configured to understand the format of the descriptors. Most of the descriptors will have at least one pointer to at least one data buffer and/or to a subsequent command or status descriptor, although some descriptors may contain no pointers (for example, descriptors for simple "reset" commands). Because the proxy controller can understand the format of the descriptors, it therefore knows which pointers are pointers to data buffers and which are pointers to subsequent descriptors. The distribution of descriptors and data buffers in the memory is arbitrary. The proxy controller modifies its copy of the descriptors such that the pointers to descriptors and data buffers are easily distinguishable, typically by assigning one or more non-significant bits in the pointer to indicate whether the pointer is, or is not, a descriptor pointer. Moreover, pointers may be modified such that one or more non-significant bits, other then those used to indicate that the pointer is a pointer to a subsequent descriptor or a data buffer pointer, are modified to indicate which of several servers or server memories contained the original non-modified descriptors or data buffers.

The number of non-significant bits used for modification is preferably chosen so as to be as few as reasonably possible given the number of servers so as to simplify the switch hardware. For example, one bit may be used to distinguish between descriptors and data buffers, and an additional N bits may then used to identify the originating server where a maximum of $2^N$ servers is supported.

In this way, the I/O device is made to operate (unknowingly) in a single unified virtual address space with a structured distribution of descriptors and data buffers rather than in a normal (e.g. PCI) physical address space where data buffers and descriptors are scattered arbitrarily within several server memory spaces.

This structured arrangement of descriptors and data buffers in the virtual address space allows the data switch to route control traffic (descriptor accesses) via the proxy controller, but to allow data traffic (to or from data buffers) to be routed by the switch directly between the I/O device and the appropriate server.

In other words, the proxy controller modifies the control traffic in such a way that the switch can identify and separate control traffic and data traffic and redirect the control traffic to the proxy controller, which may be implemented as a hardware virtualisation "co-processor", with data traffic being routed directly between the I/O device and the server.

It will be appreciated that the modification of non-significant bits can, in preferred embodiments, be seen as a mapping of descriptors into one set of regions in an address space, and a mapping of data buffers into another, disjoint, set of regions in the address space, such that the switch can easily distinguish between accesses to one or other of these two sets. In simple embodiments, this can be made relatively trivial by having each set consist of only one region, but sets comprising multiple regions may instead be implemented in more complex embodiments.

The mapping is done both by the proxy controller and by the switch. In general, the proxy controller does the forward mapping (for example, multiple server spaces to a single virtual space) by modifying the pointers. The switch does the reverse mapping (virtual space to multiple server spaces) by restoring the pointers to their original form. This means that the switch and proxy controller are essentially transparent to the servers and the I/O devices.

In PCI, control traffic typically constitutes only around 6 to 8% of the total bandwidth, which means that the proxy controller can be implemented in hardware without incurring high implementation cost such as in the NextIO solution, or low performance as in current software solutions. The proxy controller does not need to access or process data traffic, which constitutes the remaining 92 to 94% of the total bandwidth. The data traffic is routed as normal by the switch and completely bypasses the proxy controller.

A data switch as described in the present application, for example but not limited to a PCI switch, normally transports the following transaction types between the server and I/O device:

i) Commands from server to I/O devices.

ii) Status reads by server of resources in I/O devices.

iii) I/O device reading command descriptors in server memory.

iv) I/O devices writing status descriptors in server memory.

v) I/O devices reading/writing data buffers in server memory.

The switch identifies all the above transactions and redirect all except type v) to the proxy controller. Transaction type v) (which accounts for 90+% of the bandwidth) is allowed to proceed as normal. Transaction types i) and ii) are readily identified since they have unique fields in the PCI packet headers for a given direction of propagation (transaction types i) and ii) are both server-initiated transactions from server to I/O device (i.e. the first packet is sent downstream), whereas transaction types iii), iv) and v) are all device-initiated transactions, from I/O device to server). In order for the switch to separate transaction type v) from types iii) and iv), however a new mechanism is required as described in the following section.

Data buffers can only be distinguished from command/status descriptors by their addresses in memory. Since there are many examples of each in a real system, all scattered arbitrarily in memory, it is impractical for the switch to remember where every data buffer and descriptor exists in every server memory space. To separate I/O device accesses to data buffers from accesses to command/status descriptors, the I/O device is made to operate (unknowingly) in a simple 'virtual address space' rather than in the normal PCI physical address space. The virtual address space has all the command status descriptor lists in well-defined regions. This makes it easy for the switch to separating the type v) transactions from the type iii) and iv) transactions, since the switch only has to compare the memory address with a single value.

As well as separating the control and data transactions, the switch needs to know in which server a particular data buffer is placed. As with the command/status descriptors, the proxy controller can map the data buffers of each server into specific virtual address space regions such that the switch can identify the servers by a simple address comparison. As well as using the high order bits to identify the servers, the switch also restores those bits on transactions.

The proxy controller may create the virtual address space as follows:

In order to initiate an I/O operation, a server may:

1. Create a set of data buffers in its memory.
2. Create a list of command/status descriptors in memory. These have pointers to the data buffers and also pointers to the 'next' command/status descriptor.

3. The server sends a command directly to the I/O devices (type i) transaction) with a pointer to the first command descriptor. Traditionally, the I/O device would use this to read the first command descriptor from memory, but now the switch redirects this command to the proxy controller.
4. The proxy controller reads the command descriptors. It understands the format of the descriptors and hence knows which are the pointers to data buffers and which are the pointers to the next descriptor. The proxy controller modifies its copy of the descriptors such that the pointers to other descriptors are mapped into a high region of the address space (e.g. by setting the most significant bit). Data buffer pointers are modified such that the buffers of each server are mapped into a contiguous region.
5. The proxy controller modifies the original direct command from the server such that it now points to the new location of the first descriptor and forwards it on to the I/O device.
6. The I/O device uses the pointer in the command to fetch the first command descriptor. The switch identifies that this is a descriptor access from the high order address and redirects the request to the proxy controller which responds with the modified descriptor contents.
7. When the I/O device accesses a data buffer, the switch identifies this by the low order address and routes the transaction directly to the appropriate server.
8. When the I/O operation is complete, the I/O device signals the server by means of an 'interrupt' which is just a memory write to a defined location in the server memory. As with command/status descriptors, this has been remapped by the proxy controller during initialisation into a high order address region such that the switch can easily redirect it to the proxy controller.

With the above mechanisms the switch can separate the low bandwidth control traffic from the high bandwidth data traffic and send only the control traffic to the proxy controller. The proxy controller can now provide the virtualisation functions (not described here).

It is also important to note that during this operation neither the server nor the I/O device is aware that anything unusual (different from a non-virtualising system) is happening. The operation of embodiments of the invention is totally transparent to the server and the I/O device.

By modifying the normal operation of, for example, a PCI switch and operating the I/O device(s) in a virtual address space, embodiments of the present invention allow the strict separation of the control and data paths in the PCI interface between a server and an I/O device.

This in turn allows a proxy controller or virtualisation co-processor to operate exclusively on the control path without the burden of handling the high bandwidth data path.

Preferred embodiments of the present invention additionally allow the switch easily to identify which server has the required data buffer and hence to route the transaction appropriately to one of several servers. This allows a single I/O device to be shared between several servers.

Embodiments of the present invention may be implemented as a native PCI solution so as to avoid the high cost and low performance issues associated with software virtualisation.

Moreover, embodiments of the present invention do not require the redesign of a collection of I/O devices in order to comply with new standards such as PCI Multi-Root IOV. Embodiments of the present invention can work with existing legacy I/O devices.

Furthermore, embodiments of the present invention simplify the data handling requirements of the proxy controller or virtualisation co-processor by allowing the high bandwidth data path to be routed directly between the server and the I/O device. This means that the proxy controller or co-processor can be implemented in low cost hardware and hence deliver the cost/performance required for a commercially viable system.

It will be understood that pointer manipulation, as described hereinbefore, is just one aspect of top level control traffic re-routing to the proxy controller that is carried out by the switch. For most transactions between the server(s) and an I/O device, control traffic is easily identifiable as such from packet headers and therefore requires no special treatment or provisions. It is only in the memory accesses initiated by the I/O device that the complications occur (due to the fact that descriptor and data buffer accesses are normally indistinguishable in this respect), and where pointer modification or manipulation is required.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

BRIEF DESCRIPTION OF THE DRAWINGS

For a better understanding of the present invention and to show how it may be carried into effect, reference shall now be made by way of example to the accompanying drawings, in which.

DETAILED DESCRIPTION

Figure 1:
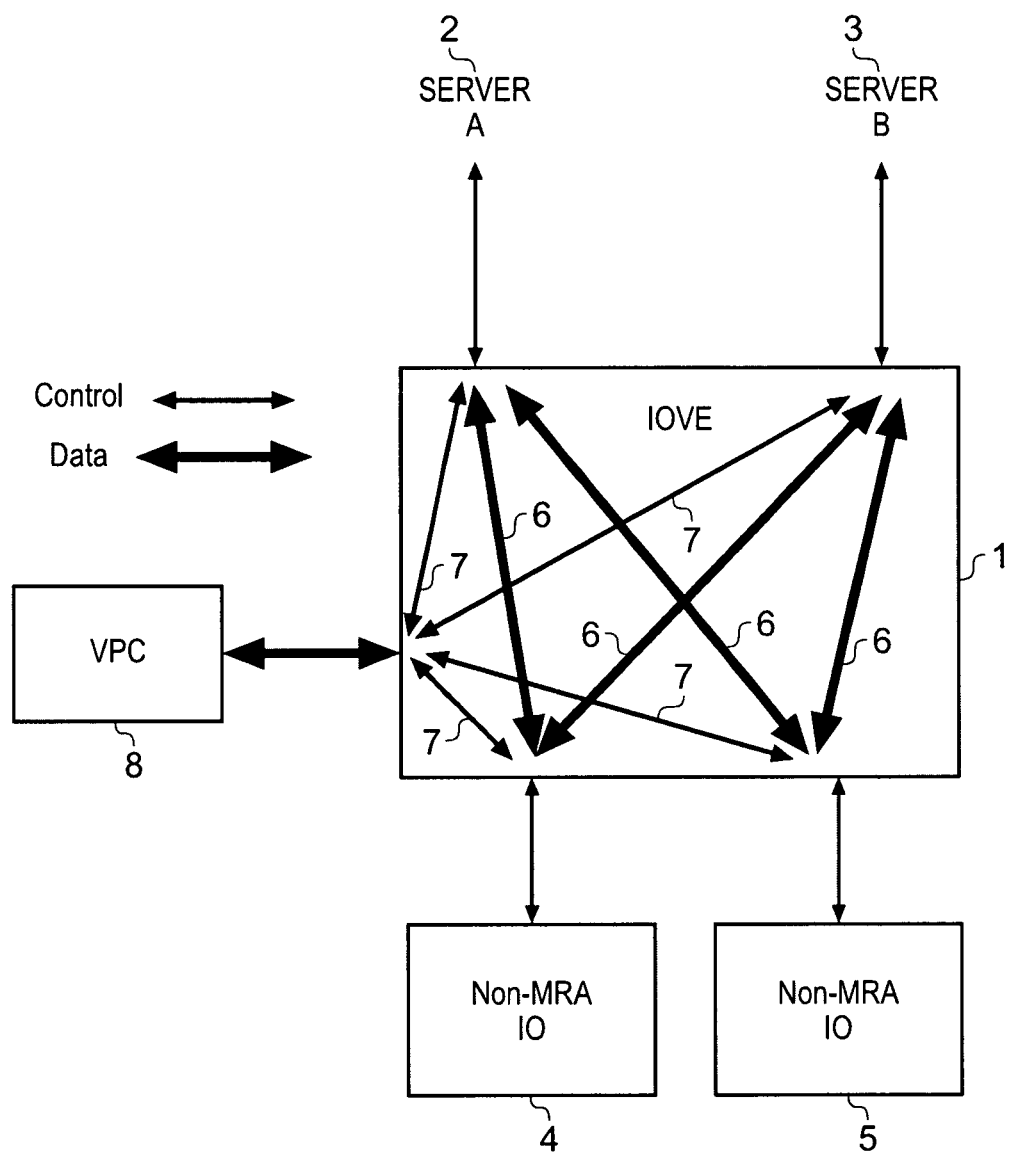
FIG. 1 shows an architecture of an embodiment of the invention.

FIG. 1 shows, in schematic form, a data switch 1 interconnected between a pair of servers 2, 3 and a pair of non-Multi Root Aware (non-MRA) I/O devices 4, 5. As can be seen from the drawing, data traffic 6 is routed directly through the switch 1 between the servers 2, 3 and the I/O devices 4, 5, while control traffic 7 is directed to a proxy controller or virtualisation co-processor 8. The bandwidth of the traffic 6, 7 is typically of the order of 20 Gb/s, with over 90% of the traffic being data traffic.6 and thus irrelevant for switching/control purposes.

The proxy controller 8 is a practical means of adding virtualisation to existing PCI I/O devices 4, 5 which helps to avoid some of the disadvantages of prior art solutions. It is based on the native PCI I/O interconnect so avoids performance reducing protocol translations and software emulation. It does not require (although it is compatible with) the new PCI-SIG Multi-Root IOV devices. It does not suffer from the cost and other practical problems (power, space) of the NextIO technology demonstrator. It does this by modifying the normal behaviour of the PCI switch 1 such that the switch 1 can separates the PCI control 7 and data 6 paths and redirect the control traffic 7 to a hardware virtualisation 'co-processor' 8. Control traffic 7 constitutes only ~6-8% of the PCI bandwidth, so the co-processor 8 can be implemented in hardware without incurring high implementation cost as in the NextIO solution or low performance as in the software solutions. The virtualisation function does not need access to the data. The high bandwidth data is routed as normal in the PCI switch 1 and completely bypasses the co-processor 8.

Figure 2:
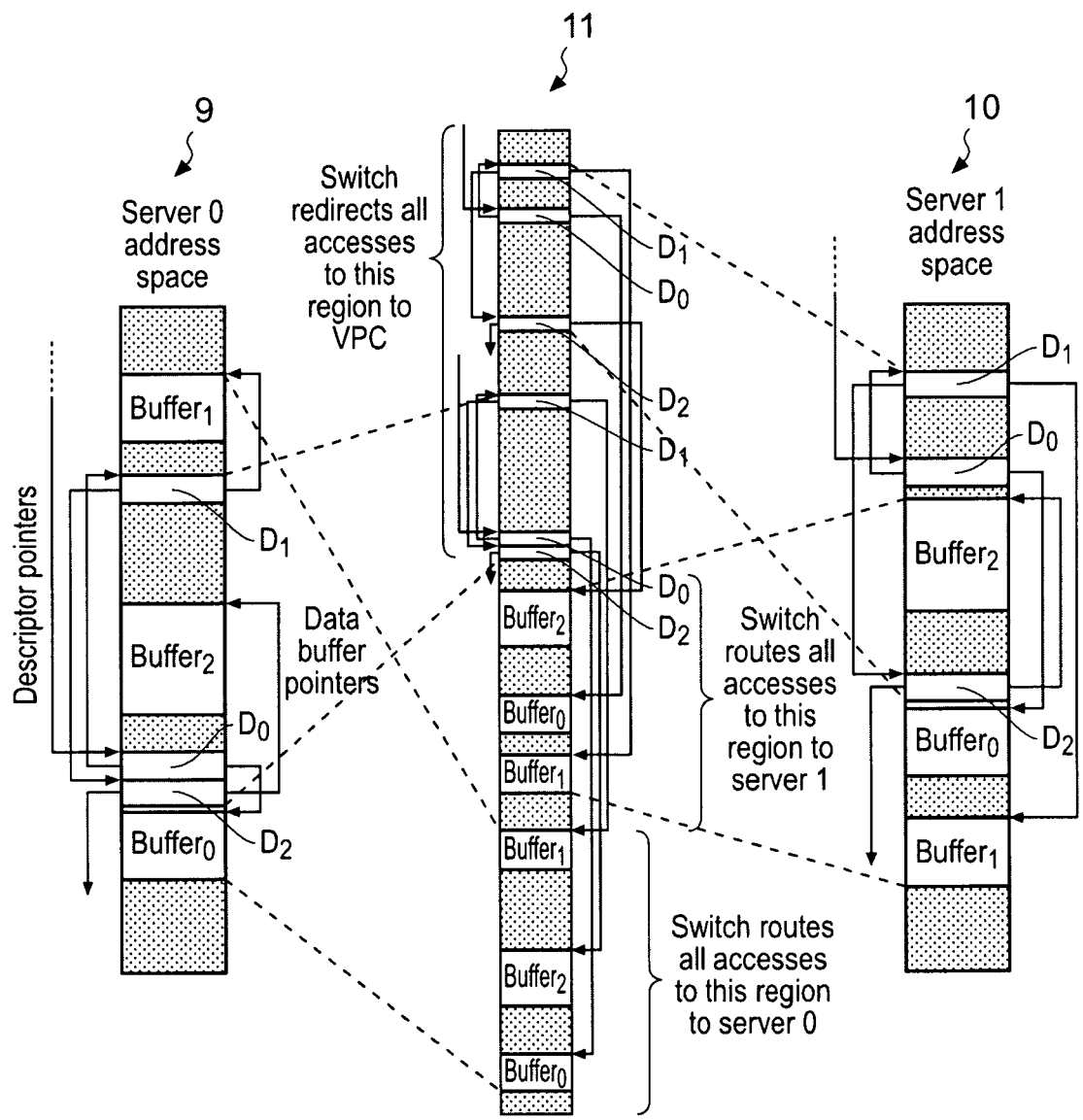
FIG. 2 shows the mapping of two server address spaces into a virtual address space.

This is achieved by mapping the server buffers into a virtual address space in the co-processor 8. An example of such a mapping is shown in FIG. 2, with the address space 9 of server 2 shown on the left, the address space 10 of server 3 shown on the right, and the virtual address space 11 shown in the middle. As can be seen, descriptor pointers $D_0$, $D_1$ and $D_2$ in each of address spaces 9 and 10 are mapped to high levels in the virtual address space 11. This is achieved by modifying the pointers in relevant descriptors, for example by setting the most significant bit of the pointer to a value (0 or 1) different to the value of the equivalent bit of a data buffer pointer.

The I/O device then uses these pointers to access the descriptors and data buffers by issuing memory access requests with the pointers placed in the address fields in the headers of the request packets.

In this way, it is trivial for the switch 1 to distinguish between type v) data traffic and type iii) or iv) control traffic and to route the traffic to the server(s) 2, 3 or the co-processor 8 as required by a simple inspection of the packet headers Moreover, in order to allow several servers 2, 3 to share a single I/O device 4, the next four bits of a packet header can be used to identify which particular server 2, 3 is the intended recipient of a control packet. Using four bits allows 16 servers to share one I/O device. Borrowing an additional bit (i.e. five bits following the leading bit) allows 32 servers to share one I/O device, and so forth.

For example, with reference again to FIG. 2, data from data buffers in server 2 are mapped to a contiguous region in the virtual address space 11 directly beneath the region in the virtual address space where the descriptor pointers D are mapped, and data from data buffers in server 3 are mapped to a contiguous region in the virtual address space 11 directly beneath where the data from the date buffers in sever 2 are mapped.

The co-processor 8 and the switch 1 may be configured or programmable to use other parts of the packet header than the first significant bit and following bits.

To give a specific example of the address mapping aspect of embodiments of the present invention, the following sequence may be considered. This assumes using the leading most significant bit for control/data traffic identification, and the following four bits for server identification:

I/O device 4 is virtualised and shared across up to 16 servers 2, 3.

Co-processor 8 assumes that the most significant 5 bits of a 64 bit server address space are unused (all '0').

Co-processor 8 modifies descriptor and data buffer pointers such that bits 59 to 62 contain the server ID.

Co-processor 8 modifies descriptor pointers such that bit 63='1'.

The switch 1 redirects all memory accesses from the I/O device 4 with bit 63='1' to the co-processor 8.

The switch 1 routes all memory accesses from the I/O device 4 with bit 63='0' to the server 2, 3 indicated by bits 59:62 while clearing those bits.

The invention claimed is:

1. A data switch in combination with a proxy controller, the data switch being configured for routing data traffic and control traffic between at least one input/output (I/O) device and at least one server including a memory having an address space including a set of data buffers and a list of command/status descriptors, the control traffic comprising transaction types:
   a) commands from at least one server to the at least one input/output (I/O) device;
   b) status reads by the at least one server of resources in the at least one I/O device;
   c) reads by the at least one I/O device of command descriptors in the memory of the at least one server;
   d) writes by the at least one I/O device of status descriptors in the memory of the at least one server; and
   the data traffic comprising transaction type:
   e) reads/writes by the at least one I/O device of data buffers in the memory of the at least one server;
   wherein the proxy controller is configured to create a virtual address space for the at least one I/O device, the virtual address space including well-defined regions for command status descriptor lists of the at least one I/O device; and
   wherein the data switch is configured to:
   i) by examining packet headers, distinguish between transaction types a) and b) on the one hand and transaction types c), d), and e) on the other hand;
   ii) by examining virtual address space addresses, distinguish between transaction types c) and d) on the one hand and e) on the other hand;
   iii) route the data traffic directly between the at least one I/O device and the at least one server; and
   iv) route only the control traffic by way of the proxy controller configured to process the control traffic to virtualise the at least one I/O device.

2. A data switch as claimed in claim 1, wherein the proxy controller is configured to read and copy the descriptors and to distinguish in the virtual address space between a first class of pointers in the descriptors that are pointers to data buffers, and a second class of pointers in the descriptors that are pointers to subsequent descriptors.

3. A data switch as claimed in claim 2, wherein to create the virtual address space the proxy controller is configured to modify its copies of the descriptors such that the first class of pointers and the second class of pointers are distinguishable from each other by the switch.

4. A data switch as claimed in claim 3, wherein the proxy controller is configured to set one or more non-significant bits in the first class of pointers in a first configuration, and to set one or more non-significant bits in the second class of pointers in a second configuration.

5. A data switch as claimed in claim 4, wherein additional non-significant bits in the first and/or second classes of pointers are set so as to provide an indication as to which of several servers contains the original non-modified descriptors and/or data buffers.

6. A data switch as claimed in claim 1, wherein the proxy controller is configured to map the address space of the at least one server into the virtual address space in the proxy controller.

7. A data switch as claimed in claim 6,
   wherein to create the virtual address space the proxy controller is configured to map the descriptors into a first set of regions of the virtual address space and to map the data buffers into a second set of regions of the virtual address space, wherein the data switch is further configured to identify transaction types c) and d) as control traffic by determining virtual address space addresses in the control traffic are located within the first set of regions of the virtual address space, and wherein the data switch is further configured to identify transaction type e) as data traffic by determining virtual address space addresses in the data traffic are located within the second set of regions of the virtual address space.

8. A data switch as claimed in claim 7, wherein the first and second sets of regions are disjoint regions.

9. A data switch as claimed in claim 7, wherein the first set and second sets of regions comprise, respectively, a single first region and a single second region.

10. A data switch as claimed in claim 7, wherein the data switch is configured such that accesses to the first set of regions of the virtual address space, which comprise control traffic, are routed by way of the proxy controller, and wherein accesses to the second set of regions of the virtual address space, which comprise data traffic, are routed directly between the I/O device and the server.

11. A method of routing data traffic and control traffic between at least one input/output (I/O) device and at least one server by way of a data switch in combination with a proxy controller, wherein the server includes a memory having a set of data buffers and a list of command/status descriptors, the control traffic comprising transaction types:

a) commands from the at least one server to the at least one input/output (I/O) device;

b) status reads by the at least one server of resources in the at least one I/O device;

c) reads by the at least one I/O device of command descriptors in the memory of the at least one server;

d) writes by the at least one I/O device of status descriptors in the memory of the at least one server; and the data traffic comprising transaction type:

e) reads/writes by the at least one I/O device of data buffers in the memory of the at least one server;

wherein the proxy controller is configured to create a virtual address space for the at least one I/O device, the virtual address space including well-defined regions for command status descriptor lists of the at least one I/O device; and wherein the data switch:

i) by examining packet headers, distinguishes between transaction types a) and b) on the one hand and transaction types c), d), and e) on the other hand;

ii) by examining virtual address space addresses, distinguishes between transaction types c) and d) on the one hand and e) on the other hand;

iii) routes the data traffic directly between the at least one I/O device and the at least one server; and iv) routes only the control traffic by way of the proxy controller configured to process the control traffic to virtualise the at least one I/O device.

12. A method according to claim 11, wherein the proxy controller reads and copies the descriptors and distinguishes in the virtual address space between a first class of pointers in the descriptors that are pointers to data buffers, and a second class of pointers in the descriptors that are pointers to subsequent descriptors.

13. A method according to claim 12, wherein to create the virtual address space the proxy controller modifies its copies of the descriptors such that the first class of pointers and the second class of pointers are distinguishable from each other by the switch.

14. A method according to claim 13, wherein the proxy controller sets one or more non-significant bits in the first class of pointers in a first configuration, and sets one or more non-significant bits in the second class of pointers in a second configuration.

15. A method according to claim 14, wherein additional non-significant bits in the first and/or second classes of pointers are set so as to provide an indication as to which of several servers contains the original non-modified descriptors and/or data buffers.

16. A method according to claim 11, wherein the proxy controller maps the address space of the at least one server into a virtual address space in the proxy controller.

17. A method according to claim 16, wherein to create the virtual address space the proxy controller maps the descriptors into a first set of regions of the virtual address space and maps the data buffers into a second set of regions of the virtual address space, wherein the data switch identifies transaction types c) and d) as control traffic by determining virtual address space addresses in the control traffic are located within the first set of regions of the virtual address space, and wherein the data switch identifies transaction type e) as data traffic by determining virtual address space addresses in the data traffic are located within the second set of regions of the virtual address space.

18. A method according to claim 17, wherein the first and second sets of regions are disjoint regions.

19. A method according to claim 17, wherein the first set and second sets of regions each comprise, respectively, a single first region and a single second region.

20. A method according to claim 17, wherein accesses to the first set of regions of the virtual address space, which comprise control traffic, are routed by way of the proxy controller, and wherein accesses to the second set of regions of the virtual address space, which comprise data traffic, are routed directly between the I/O device and the at least one server.

* * * * *

UNITED STATES PATENT AND TRADEMARK OFFICE
CERTIFICATE OF CORRECTION

PATENT NO. : 9,021,125 B2
APPLICATION NO. : 12/315723
DATED : April 28, 2015
INVENTOR(S) : Piekarski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this
Seventeenth Day of November, 2015

Michelle K. Lee
*Director of the United States Patent and Trademark Office*